US008023483B2

(12) United States Patent
Senga et al.

(10) Patent No.: US 8,023,483 B2
(45) Date of Patent: Sep. 20, 2011

(54) COMMUNICATION MANAGEMENT APPARATUS, COMMUNICATION CONTROL APPARATUS, AND WIRELESS COMMUNICATION SYSTEM

(75) Inventors: Satoshi Senga, Saitama (JP); Hidenori Ishii, Tokyo (JP); Hiroshi Ishida, Kanagawa (JP); Takeshi Kanazawa, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1001 days.

(21) Appl. No.: 11/886,951

(22) PCT Filed: Mar. 17, 2006

(86) PCT No.: PCT/JP2006/305396
§ 371 (c)(1),
(2), (4) Date: Sep. 24, 2007

(87) PCT Pub. No.: WO2006/101048
PCT Pub. Date: Sep. 28, 2006

(65) Prior Publication Data
US 2009/0052414 A1   Feb. 26, 2009

(30) Foreign Application Priority Data
Mar. 24, 2005   (JP) .................................. 2005-086492

(51) Int. Cl.
*H04W 4/00* (2009.01)
(52) U.S. Cl. ........................................ 370/338; 370/401
(58) Field of Classification Search .................. 370/335, 370/336, 338, 401, 463
See application file for complete search history.

(56) References Cited

U.S. PATENT DOCUMENTS

| | | | |
|---|---|---|---|
| 6,330,445 B1 | 12/2001 | Skog et al. | |
| 6,839,356 B2 * | 1/2005 | Barany et al. | 370/401 |
| 7,292,592 B2 * | 11/2007 | Rune | 370/401 |
| 7,505,431 B2 * | 3/2009 | Chitrapu et al. | 370/331 |
| 2004/0017798 A1 | 1/2004 | Hurtta et al. | |
| 2005/0226250 A1 | 10/2005 | Makayama et al. | |

FOREIGN PATENT DOCUMENTS

JP   2000-224233   8/2000

(Continued)

OTHER PUBLICATIONS

International Search Report of May 30, 2006 issued in International Application No. PCT/JP2006/305396.

(Continued)

*Primary Examiner* — Dang Ton
*Assistant Examiner* — Brian O Connor
(74) *Attorney, Agent, or Firm* — Wenderoth, Lind & Ponack, L.L.P.

(57) ABSTRACT

A 3G authentication apparatus includes: a WLAN communication section which receives a notification of reception of a connection request sent from a WLAN access network in response to the connection request from a mobile unit to connect to a WLAN capable of interworking with a mobile network; a communication section for obtaining, from a user information storing device, information indicating a service available in the mobile communication network to the mobile unit that has sent the connection request, on the basis of the notification of reception of the connection request; and a filter setting section which generates filter information by associating a user authentication ID identifying a mobile unit with an IP address obtained at the communication section. The filter information generated by the filter setting section is sent to the WLAN access network through the WLAN communication section. Thus, traffic in a network such as a WLAN in an interworking system between networks such as a mobile communication network and a WLAN can be reduced.

6 Claims, 10 Drawing Sheets

FOREIGN PATENT DOCUMENTS

| | | |
|---|---|---|
| JP | 2002-538740 | 11/2002 |
| JP | 2003-283550 | 10/2003 |
| JP | 2003-534714 | 11/2003 |
| WO | 03/107611 | 12/2003 |

OTHER PUBLICATIONS

TS22.234 ver. 6.2.0 "Requirements on 3GPP system to Wireless Local Area Network (WLAN) interworking", Sep. 27, 2004 (Chapter 6) http://www.3gpp.org/ftp/Specs/html-info/22234.htm.

TS23.234 ver. 6.3.0 "3GPP system to Wireless Local Area Network (WLAN) interworking", Jan. 7, 2005 (Chapter 6) http://www.3gpp.org/ftp/Specs/html-info/23234.htm.

TS33.234 ver. 6.3.0 "Wireless Local Area Network (WLAN) interworking security", Dec. 23, 2004 (Chapter 6) http://www.3gpp.org/ftp/Specs/html-info/33234.htm.

English translation of the International Preliminary Report on Patentability issued Sep. 25, 2007 in PCT/JP2006/305396.

\* cited by examiner

FIG. 5

| | |
|---|---|
| USER AUTHENTICATION ID | ID1@iw.operator.com |
| 3G USER IDENTIFIER | IMSI1 |
| LOCAL IP ADDRESS | IP Address A |
| PASS IP ADDRESS | AA.BB.XX.XX |
| PASS Port NUMBER | 1000;1500 |

| USER AUTHENTICATION ID | ID1@iw.operator.com | ID2@iw.operator.com |
|---|---|---|
| 3G USER IDENTIFIER | IMSI1 | IMSI2 |
| LOCAL IP ADDRESS | IP Address A | IP Address B |
| PASS IP ADDRESS | AA.BB.XX.XX | AA.BB.XX.XX |
| PASS Port ADDRESS | 1000,1500 | 1000,2500 |

COMMUNICATION MANAGEMENT APPARATUS, COMMUNICATION CONTROL APPARATUS, AND WIRELESS COMMUNICATION SYSTEM

TECHNICAL FIELD

The present invention relates to an interworking system between networks of different types such as between a mobile communication network as typified by a W-CDMA (Wideband-Code Division Multiple Access) network and a WLAN (Wireless Local Area Network) and, in particular, to a transmission control technique in packet communication.

BACKGROUND ART

Engineers are working to develop a system that interworks between a mobile phone capable of communicating in a wide area and a wireless LAN service which enables fast data communication in a relatively small area to cause them to complement each other. Architectures of interworking systems that implement scenarios for accessing packet services of a mobile communication network through a WLAN are standardized in the 3GPP (3rd Generation Partnership Project). Requirements concerning access to packet service of a mobile communication network over a WLAN are described in TS 22.234 Ver. 6.2.0 "Requirements on 3GPP system to Wireless Local Area Network (WLAN) interworking", Chapter 5, Sep. 27, 2004, http://www.3gpp.org/ftp/Specs/html-info/22234.htm. The architecture is described in TS 23.234 Ver. 6.3.0 "3GPP system to Wireless Local Area Network (WLAN) interworking", Chapter 6, Jan. 7, 2005, http://www.3gpp.org/ftp/Specs/html-info/23234.htm. The authentication method is described in TS 33.234 Ver. 6.3.0 "Wireless Local Area Network (WLAN) interworking security", Chapter 6, Dec. 23, 2004, http://www.3gpp.org/ftp/Specs/html-info/33234.htm.

FIG. 9 is a diagram showing a configuration of an interworking system built with a conventional technology. A terminal 901 is capable of making packet access to both of a mobile communication network and a WLAN.

The terminal 901 corresponds to UE (User Equipment) in the 3GPP specifications. A WLAN access network 902 is a packet network using a protocol such as IP (Internet Protocol) and converts a radio signal in a WLAN into a packet signal in a wired network. The WLAN access network corresponds to WLAN AN (Access Network) in the 3GPP specifications. A DHCP server (not shown) in the WLAN access network 902 performs address assignment operation.

A WLAN gateway 903 is connected to the WLAN access network 902 and communicates WLAN control data and user data to and from the WLAN access network 902. The WLAN gateway 903 corresponds to WAG (Wireless Access Gateway) in the 3GPP specifications. A packet data gateway 904 is connected to the WLAN gateway 903 and relays packet data to a public packet-switched network 912. The packet data gateway 904 relays packet data from the public packet-switched network 912 to the WLAN and relays packet data from the WLAN to the public packet-switched network 912. The packet data gateway 904 corresponds to PDG (Packet Data Gateway) in the 3GPP specifications.

A base station 905 in a mobile communication network converts a radio signal from the terminal 901 into a wired signal and transmits the converted signal. The base station 905 corresponds to Node B in the 3GPP specifications. A radio network controller 906 is connected with the base station 905 and performs radio terminal control and transmits control data and user data on the mobile communication network. The radio network controller 906 corresponds to RNC (Radio Network Controller) in the 3GPP specifications. A packet controller 907 is connected to the radio network controller 906, controls packet transmission within the mobile communication network and manages the status of terminals 901 that relates to packet transmission. The packet controller 907 corresponds to SGSN (Serving GPRS Support Node) in the 3GPP specifications. A mobile network packet gateway 908 is connected to the packet controller 907 and relays packet data from the mobile communication network to the public packet-switched network 912 (the Internet). The mobile network packet gateway 908 corresponds to GGSN (Gateway GPRS Support Node) in the 3GPP specifications.

A service server 914 is a server that manages services provided by the mobile communication network. When the services are accessed from the WLAN, the service server 914 is accessed through the packet data gateway 904. A 3G authentication apparatus 909 is connected to the WLAN access network 902 and the packet data gateway 904 and transfers authentication data provided from the terminal 901 and authentication information for the terminal 901. The 3G authentication apparatus 909 corresponds to AAA Server in the 3GPP specifications. A user information storing device 910 stores information about a service provided to a user under an agreement between the user and the carrier of the mobile communication network or the WLAN. The user information storing device 910 is connected with the packet controller 907, the mobile network packet gateway 908, and the 3G authentication apparatus 909.

When a user moves from an area covered by the mobile communication network to the WLAN in the system while making packet access using the terminal 901 capable of accessing both of the mobile communication network and WLAN, mobility transparency to its correspondent node 913 must be ensured in order to maintain communication. To that end, the system has a home address management device 911. The correspondent node 913 is a terminal with which the terminal 901 is performing packet communication. Examples of the correspondent node 913 include a server provided on the Internet. The home address management device 911 relays data transmission from the correspondent node 913 and changes the transfer destination of data in accordance with the location to which the terminal 901 is moving. The position of the terminal 901 is managed and registered using Mobile IP.

The following is a description of a method for the terminal 901 to switch to packet communication over the WLAN when the terminal 901 enters an area of the WLAN while performing packet communication with the correspondent node 913 over the mobile communication network in the system described above.

FIG. 10 shows operation for switching from the mobile communication network to the WLAN. The terminal 901 is performing IP packet communication with the correspondent node 913 through nodes of the mobile communication network and the home address management device 911 (S80). The IP address of the terminal 901 used within the mobile communication network is assigned by the mobile network packet gateway 908. The IP address is referred to as the remote IP address. The home address management device 911 manages the set of the home IP address which is the address of the terminal 901 in the home network and the remote IP address of the terminal 901. The home address management device 911 encapsulates IP packets directed from the correspondent node 913 to the home IP address of the terminal 901 and transmits the encapsulated IP packets.

Similarly, the home address management device 911 encapsulates IP packets output from the terminal 901 and then transmits them to the correspondent node 913.

In the mobile communication network, an IP tunnel is created between nodes and IP packets are encapsulated before transmission. GTP (GPRS Tunneling Protocol) is used between the mobile network packet gateway 908 and the packet controller 907 and between the packet controller 907 and the radio network controller 906. In the radio network controller 906, IP packets are converted into a logical channel or transport channel as appropriate and then transferred to the base station 905 using IP transport. The base station 905 converts packets into a physical channel of W-CDMA to communicate with the terminal 901.

When the terminal 901 enters a WLAN area (S82), the terminal 901 detects the radio field of the WLAN and authentication processing for the terminal 901 to use an access point is performed in the WLAN access network 902 (S84). Then, processing for authenticating the user is performed between the WLAN access network 902 and the 3G authentication apparatus 909 (S86). In this processing, the 3G authentication apparatus 909 accesses the user information storing device 910 to authenticate whether the user is a subscriber of an interworking service. After completion of the authentication, the DHCP server in the WLAN access network 902 assigns an IP address to be used for IP communication to the terminal 901 (S88). The IP address assigned here is referred to as the local IP address.

Then, the terminal 901 sends a PDG address resolution request to the packet data gateway 904 (S90). The packet data gateway 904 is a gateway for a terminal to perform IP packet communication with the correspondent node 913 over the WLAN from the mobile communication network. The packet gateway 904 assigns to the terminal 901 an IP address for the terminal 901 to use the WLAN from the mobile communication network.

The terminal 901 sends a tunnel creation request to the packet data gateway 904 for communication over the WLAN (S92). In response to the tunnel creation request, the packet data gateway 904 communicates with the 3G authentication apparatus 909 to perform an authentication completion determining process to determine whether the terminal 901 has been authenticated as a subscriber of the interworking service (S94). Then, authentication setting is performed between the packet data gateway 904 and the WLAN gateway 903 to set information concerning the authenticated terminal 901 in the WLAN gateway 903 (S96). The authentication setting enables control such that packet data received from an unauthenticated terminal is prevented from being transmitted to the data packet gateway 904.

After the authentication setting, tunnel attributes are exchanged between the terminal 901 and the packet data gateway 904 to create a tunnel between them (S98). After the tunnel is created, the terminal 901 registers its remote IP address in the home address management device 911 through the packet data gateway 904 (S100). After the remote IP address is registered, the remote address management device 911 changes the destination of packet transmitted from the correspondent node 913 to the terminal 901 associated with the new remote IP address.

After connection to the WLAN is established in this way (S102), the terminal 901 disconnects communication over the mobile communication network that was used before the terminal 901 enters the WLAN area. This processing is initiated by issuing a 3G disconnection to the packet controller 907 (S104).

DISCLOSURE OF THE INVENTION

In the interworking system described above, the packet data gateway 904 has the capability of accessing the service server 914 to enable a service of the mobile communication network to be received from the WLAN. However, traffic from the WLAN gateway 903 to the packet data gateway 904 occurs both when the service server 914 is accessed and when the public packet-switched network 912 is accessed. The traffic can cause congestion between the packet data gateway 904 and the WLAN gateway 903.

The present invention has been made in light of these circumstances and an object of the present invention is to provide a communication management apparatus, a communication controller, and a wireless communication system for reducing traffic and minimizes congestion in a network such as a WLAN in an interworking system between a mobile communication network and a WLAN.

A communication management apparatus according to the present invention includes: a connection request reception notification receiving section which receives a notification of reception of a connection request from a mobile unit of a mobile communication network which is sent by a communication controller of another network capable of interworking with the mobile communication network upon reception by the communication controller of the connection request; a service information obtaining section which obtains information indicating a service available to the mobile unit that has sent the connection request in the mobile communication network, on the basis of the notification of reception of the connection request; a filter information generating section which generates filter information by associating information identifying the mobile unit with an IP address to be used in the service indicated by the information obtained at the service information obtaining section; and a filter information transmitting section which transmits the filter information generated by the filter information generating section to the communication controller of the another network.

With this configuration, because filter information including an IP address used in a service available to the mobile unit in the mobile communication network is generated and sent to the communication controller of the other network, the communication controller of the other network can determine on the basis of the filter information and the destination of packets sent from the mobile unit whether access is made for using the service of the mobile communication network or for other purpose. Based on the determination, the communication controller can choose whether or not to transfer the packets to the gateway in the other network that has the capability of accessing the mobile communication network. Thus, the problem that all packets are transferred to the gateway can be avoided and consequently traffic and congestion in the other network can be reduced.

A communication management apparatus of the present invention includes: a connection request reception notification receiving section which receives a notification of reception of a connection request from a mobile unit of a mobile communication network which is sent by a communication controller of another network capable of interworking with the mobile communication network upon reception by the communication controller of the connection request; a service information obtaining section which obtains information indicating a service available to the mobile unit that has sent the connection request in the mobile communication network, on the basis of the notification of reception of the connection request; a filter information generating section which generates filter information by associating information identifying the mobile unit with a port number to be used in the service indicated by the information obtained at the service information obtaining section; and a filter information transmitting section which transmits the filter information generated by the filter information generating section to the communication controller of the another network.

Thus, like the aspect of the invention described earlier, this aspect of the invention enables determination as to whether access is for using a service of the mobile communication network or for other purpose on the basis of the filter information and the port number of packets sent from the mobile unit.

The communication management apparatus may include: an IP address setting section which sets an IP address when information indicating a service is obtained by the service information obtaining section, the IP address identifying in the another network the mobile unit that has sent the connection request.

With the configuration described above in which an IP address that identifies a mobile unit in the other network is set when information indicating a service is obtained, the setting of the IP address indicates that the mobile unit can use the service of the mobile communication network. Thus, subsequent additional authentication is not needed and therefore the time required for establishing connection to the other network can be reduced.

An authentication apparatus of the present invention includes: a connection request reception notification receiving section which receives a notification of reception of a connection request from a mobile unit of a mobile communication network which is sent by a communication controller of another network capable of interworking with the mobile communication network upon reception by the communication controller of the connection request; an authentication section which performs authentication, based on the notification of reception of the connection request, as to whether the mobile unit that has sent the connection request is allowed to connect to the another network; a service information obtaining section which obtains information indicating a service available in the mobile communication network to the mobile unit that has sent the connection request when the mobile unit is authenticated by the authentication section; and a filter information generating section which generates filter information by associating information identifying the mobile unit with an IP address to be used in the service indicated by the information obtained at the service information obtaining section; and a filter information transmitting section which transmits the filter information generated by the filter information generating section to the communication controller of the another network.

With this configuration, the communication controller of the other network, like the communication management apparatus described earlier, can determine on the basis of filter information and the destination of packets sent from the mobile unit whether access is for using a service of the mobile communication network or for other purpose. Based on the determination, the communication controller can choose whether or not to transfer the packets to the gateway in the other network that has the capability of accessing the mobile communication network. Thus, the problem that all packets are transferred to the gateway can be avoided and consequently traffic can be reduced and congestion minimized in the other network.

A communication controller which controls a network of the present invention includes: a connection request receiving section which receives a connection request from a mobile unit; a filter information obtaining section which obtains filter information in which an IP address used in a service available to the mobile unit in a mobile communication network that differs from the network is associated with identification information identifying the mobile unit; and a packet controlling section which, upon transmission of packets from the mobile unit, reads an IP address from filter information containing identification of the mobile unit that has sent the packets and, when the destination of the packets sent from the mobile unit matches the IP address read from the filter information, transfers the packets to a gateway having the capability of relaying packets from a public packet-switched network to the network and being connected to the mobile communication network, and when the destination does not match the IP address, transfers the packets to the public packet-switched network without passing the packets through the gateway.

Determination is made on the basis of filter information obtained at the filter information obtaining section and the destination of packets sent from the mobile unit as to whether access is for using a service of the mobile communication network or for other purpose and, when the service of the mobile communication network is not used, the packets are not transferred to the gateway. Thus, traffic in the network can be reduced.

A wireless communication system of the present invention includes a communication controller which controls packet communication in a network capable of interworking with a mobile communication network and an authentication apparatus which performs authentication as to whether a mobile unit is allowed to connect to the network, wherein, the authentication apparatus includes: a connection request reception notification receiving section which receives a notification of reception of a connection request, the notification being provided from the communication controller upon reception by the communication controller of the connection request from a mobile unit to connect to the network; a service information obtaining section which obtains information indicating a service available in the mobile communication network to the mobile unit that has sent the connection request, on the basis of the notification of reception of the connection request; a filter information generating section which generates filter information by associating information identifying the mobile unit with an IP address to be used in the service indicated by the information obtained at the service information obtaining section; and a filter information transmitting section which transmits the filter information generated by the filter information generating section to the communication controller of the network; and the communication controller includes: a packet controlling section which, upon transmission of packets from the mobile unit, reads an IP address from filter information containing identification of the mobile unit that has sent the packets and, when the destination of the packets sent from the mobile unit matches the IP address read from the filter information, transfers the packets to a gateway having the capability of relaying packets from a public packet-switched network to the network and being connected to the mobile communication network, and when the destination does not match the IP address, transfers the packets to the public packet-switched network without passing the packets through the gateway.

With this configuration, the wireless communication system, like the communication controller described earlier, can determine whether access is for using a service of a mobile communication network or for other purpose and, when the service of the mobile communication network is not used, packets are not transferred to the gateway. Thus, traffic in the network can be reduced.

A communication management method of the present invention includes: a connection request reception notification receiving step of receiving a notification of reception of a connection request from a mobile unit of a mobile communication network which is sent by a communication controller of another network capable of interworking with the mobile communication network upon reception by the communication controller of the connection request; a service information obtaining step of obtaining information indicating a service available in the mobile communication network to the mobile unit that has sent the connection request, on the basis of the notification of reception of the connection request; a filter information generating step of generating filter information by associating information identifying the mobile unit with an IP address to be used in the service indicated by the information obtained at the service information obtaining step; and a filter information transmitting step of transmitting the filter information generated at the filter information generating step to the communication controller of the another network.

With this configuration, the communication controller of the other network can determine on the basis of the filter information and the destination of packets sent from the mobile unit whether access is for using a service of the mobile communication network or for other purpose. Base on the determination, problem that all packets are transferred to the gateway can be avoided and consequently traffic can be reduced and congestion minimized in the other network. Various configurations of the communication management apparatus of the present invention may also be applied to the communication management method of the present invention.

A communication method of the present invention is a communication method in a network comprising a communication controller which controls packet communication in a network capable of interworking with a mobile communication network and an authentication apparatus which performs authentication as to whether a mobile unit is allowed to connect to the network, the communication method including: a connection request reception notification transmitting step of, by the communication controller, transmitting a notification of reception of a connection request to the authentication apparatus upon reception by the communication controller of the connection request from a mobile unit to connect to the network; a service information obtaining step of, by the authentication apparatus, obtaining information indicating a service available to the mobile unit that has sent the connection request in the mobile communication network, on the basis of the notification of reception of the connection request; a filter information generating step of, by the authentication apparatus, generating filter information by associating information identifying the mobile unit with an IP address to be used in the service indicated by the information obtained at the service information obtaining step; a filter information transmitting step of, by the authentication apparatus, transmitting the filter information generated at the filter information generating step to the communication controller of the network; and a packet controlling step of, by the communication controller, upon transmission of packets from the mobile unit, reading an IP address from filter information containing identification of the mobile unit that has sent packets and, when the destination of the packets sent from the mobile unit matches the IP address read from the filter information, transferring the packets to a gateway relaying packets from a public packet-switched network to the network and being connected to the mobile communication network, and when the destination does not match the IP address, transferring the packets to the public packet-switched network without passing the packets through the gateway.

With this configuration, the communication controller of the other network can determine on the basis of the filter information and the destination of packets sent from the mobile unit as to whether access is for using a service of the mobile communication network or for other purpose. Based on the determination, problem that all packets are transferred to the gateway can be avoided and consequently traffic can be reduced and congestion minimized in the other network. Various configurations of the communication management apparatus of the present invention may also be applied to the communication method of the present invention.

As will be described below, there are other modes of the present invention. Therefore the disclosure of the present invention is intended to provide some embodiments of the present invention and is not intended to limit the scope of the present invention claimed.

BRIEF DESCRIPTION OF THE DRAWINGS

FIG. 5 is a diagram showing a filter setting notification according to the first embodiment;

DETAILED DESCRIPTION OF THE INVENTION

A wireless communication system in which a 3G authentication apparatus, a WLAN gateway, and a mobile communication network interwork with a WLAN will be described in detail with reference to the accompanying drawings. However, the detailed description and drawings do not limit the present invention. The scope of the present invention is limited only by the attached claims.

Figure 1:
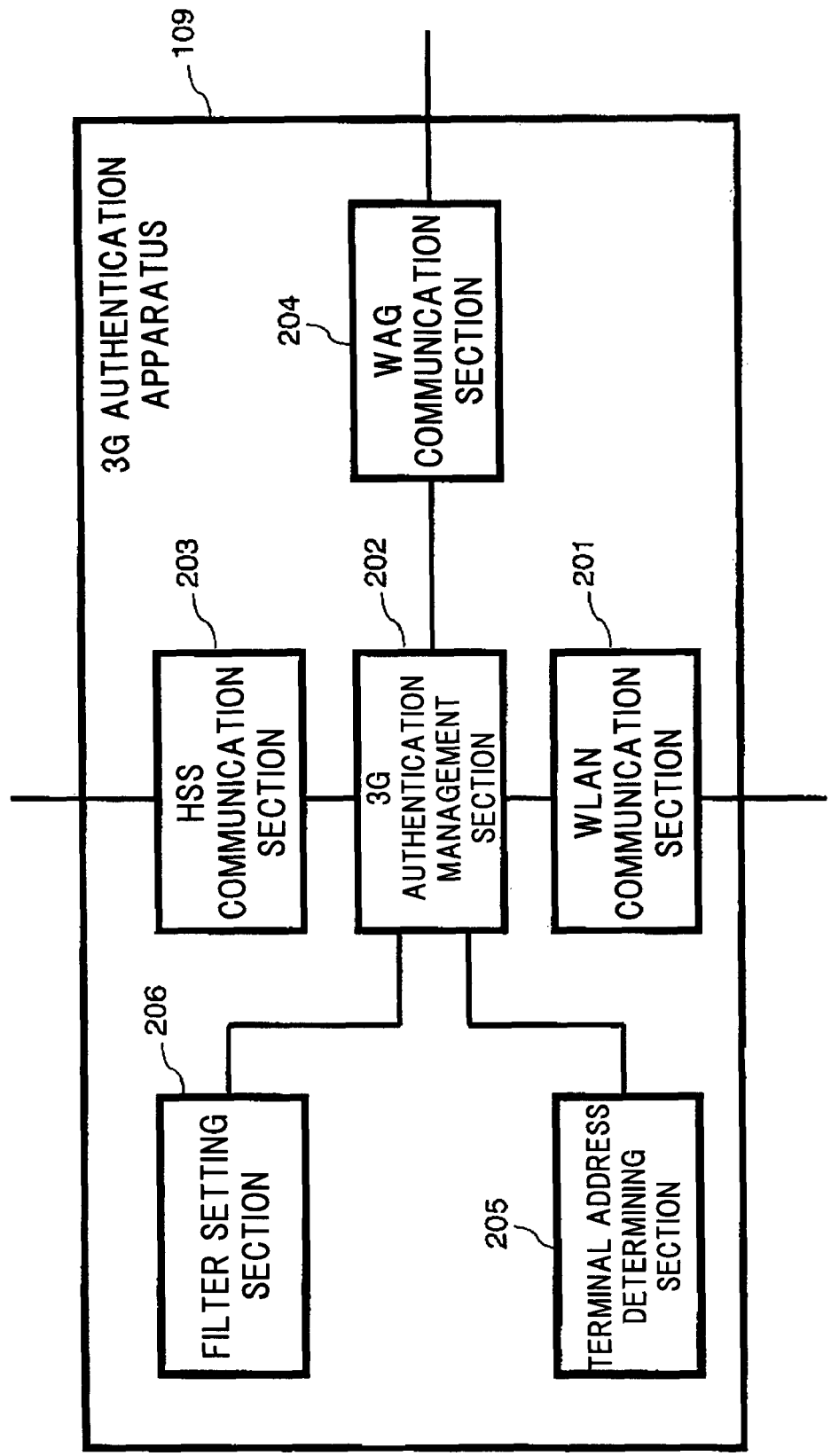
FIG. 1 is a diagram showing a configuration of a 3G authentication apparatus according to a first embodiment of the present invention.

FIG. 1 shows a configuration of a 3G authentication apparatus in an embodiment of the present invention. The 3G authentication apparatus has the function of a communication management apparatus. Before describing the 3G authentication apparatus in detail, a wireless communication system to which the 3G authentication apparatus is applied will be descried.

Figure 2:
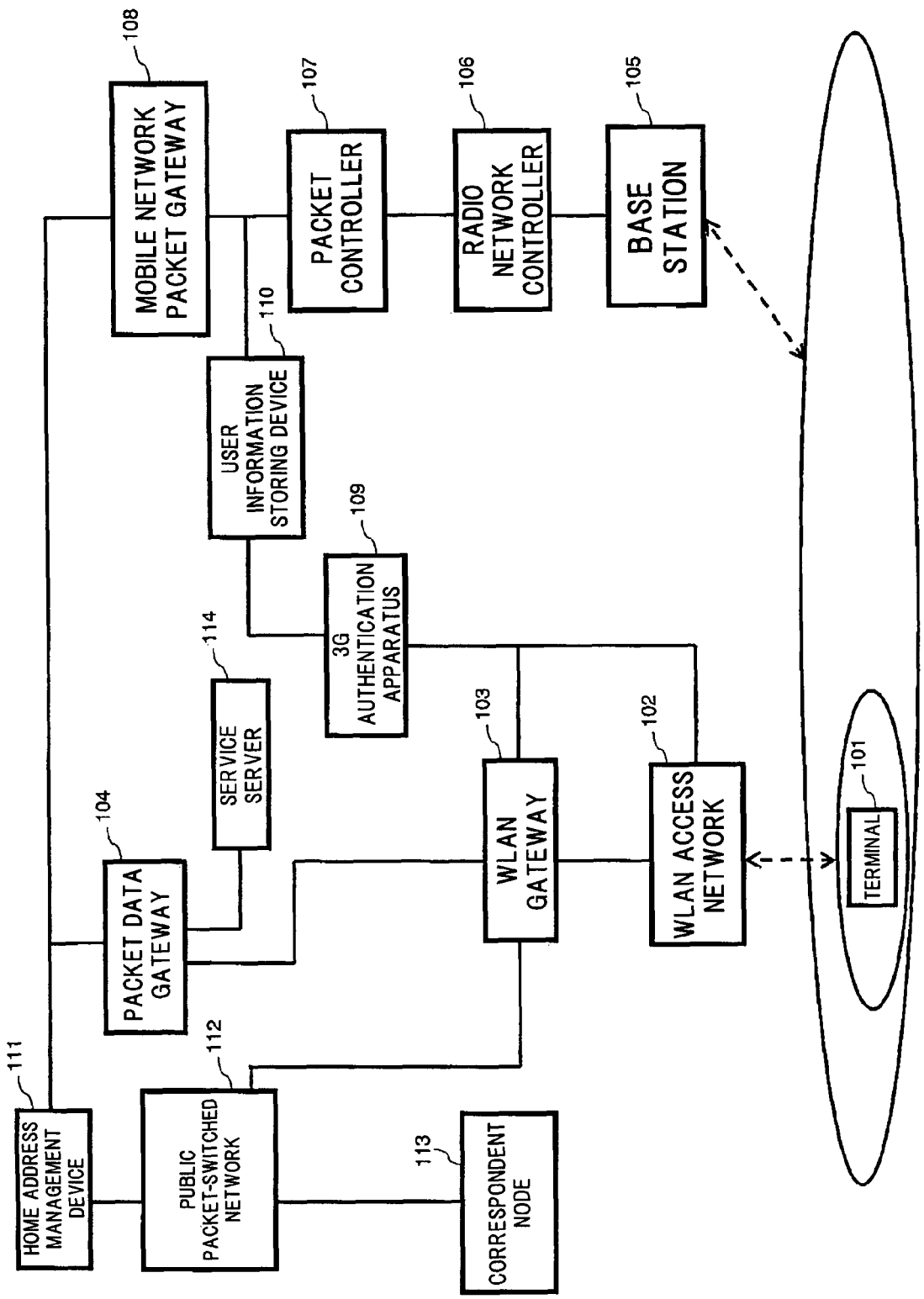
FIG. 2 is a diagram showing an architecture of an interworking system between a WLAN and a mobile communication network according to the first embodiment.

FIG. 2 is a schematic diagram illustrating a configuration of an architecture of a wireless communication system applied to the present embodiment in which a mobile communication network and a WLAN interwork each other. A terminal 101 is a terminal that has access to both mobile communication network and WLAN. The terminal 101 corresponds to UE in the 3GPP specifications.

A WLAN access network 102 is a packet network using a protocol such as IP and converts a radio signal in the WLAN to a packet signal in a wired network. The WLAN access network 102 corresponds to WLAN AN in the 3GPP specifications. A DHC server (not shown) in the WLAN access network 102 performs operation for assigning addresses.

A WLAN gateway 103 is connected to the WLAN access network 102, the 3G authentication apparatus 109, and a public packet-switched network 112. The WLAN gateway 103 corresponds to WAG in the 3GPP specifications. The WLAN gateway 103 communicates control data and user data of the WLAN to and from the WLAN access network 102. The WLAN gateway 103 exchanges with the 3G authentication apparatus 109 authentication information required for user authentication, and filter setting information for creation of a tunnel. A packet data gateway 104 is connected to the WLAN gateway 103. The packet data gateway 104 relays packet data to the public packet-switched network 112. That is, the packet data gateway 104 relays packet data from the public packet-switched network 112 to the WLAN and packet data from the WLAN to the public packet-switched network 112. The packet data gateway 104 corresponds to PDG in the 3GPP specifications.

A base station 105 converts a radio signal sent from the terminal 101 into a wired signal and transfers the converted signal in the mobile communication network. The base station 105 corresponds to Node B in the 3GPP specifications. A radio network controller 106 is connected to the base station 105 using IP and performs terminal control relating to wireless communications and transmits control data and user data in the mobile communication network. The radio network controller 106 corresponds to RNC of the 3GPP specifications. The radio network controller 106 and the base station 105 may be interconnected using ATM.

A packet controller 107 is connected to the radio network controller 106 through IP. The packet controller 107 performs packet transmission control on the mobile communication network and manages the status of the terminal 101 relating to packet transmission. The packet controller 107 corresponds to SGSN in the 3GPP specifications. The packet controller 107 and the radio network controller 106 may be interconnected using ATM.

A mobile network packet gateway 108 is connected to the packet controller 107. The mobile network packet gateway 108 relays packet data from the mobile communication network to the public packet-switched network 112. The mobile network packet gateway 108 corresponds to GGSN in the 3GPP specifications.

A service server 114 is a server that manages services provided by the mobile communication network. When the service server 114 is to be accessed from the WLAN, the service server 114 is accessed through the packet data gateway 104.

The 3G authentication apparatus 109 is connected to the WLAN access network 102 and the WLAN gateway 103. The 3G authentication apparatus 109 communicates authentication data from the terminal 101 and filter setting information used for creating a tunnel. The 3G authentication apparatus 109 corresponds to AAA Server in the 3GPP specifications.

A user information storing device 110 is connected to the packet controller 107, the mobile network packet gateway 108, and the 3G authentication apparatus 109. The user information storing device 110 stores information about a service provided by the communication carrier of the mobile communication network or the WLAN to a user under a service agreement between the carrier and the user.

The 3G authentication apparatus 109 according to the embodiment will be described below with reference to FIG. 1. The 3G authentication apparatus 109 includes multiple communication interfaces for connecting to the user information storing device 110, the WLAN gateway 103, and the WLAN access network 102. The 3G authentication apparatus 109 according to the embodiment differs from an authentication apparatus of a conventional art in that the 3G authentication apparatus 109 assigns a local IP address to a terminal, sets a filter for the WLAN gateway, and notifies the settings.

An HSS communication section 203 has the function of communicating with the user information storing device 110 and checks information about a service provided by the communication carrier of the mobile communication network or the WLAN to a user under a service agreement between the carrier and the user. A WAG communication section 204 has the function of communicating with the WLAN gateway 103. A WLAN communication section 201 has the function of communicating traffic involved in authentication to and from the WLAN access network 102.

A 3G authentication management section 202 performs user authentication processing in the mobile communication network and the WLAN. When authentication is successful, the 3G authentication management section 202 requests a terminal address determining section 205 to assign a local IP address to the terminal 101. The 3G authentication management section 202 then provides the local IP address assigned to the terminal 101 and the result of authentication of the user to a filter setting section 206. The terminal address determining section 205 has the function of determining a local IP address that the terminal 101 can use in an area of the WLAN. The filter setting section 206 generates a filter setting notification based on the local IP address of the terminal 101 received from the 3G authentication management section 202 and the user's authentication information. The generated filter setting notification is sent to the WLAN gateway 103 through the WAG communication section 204.

Figure 3:
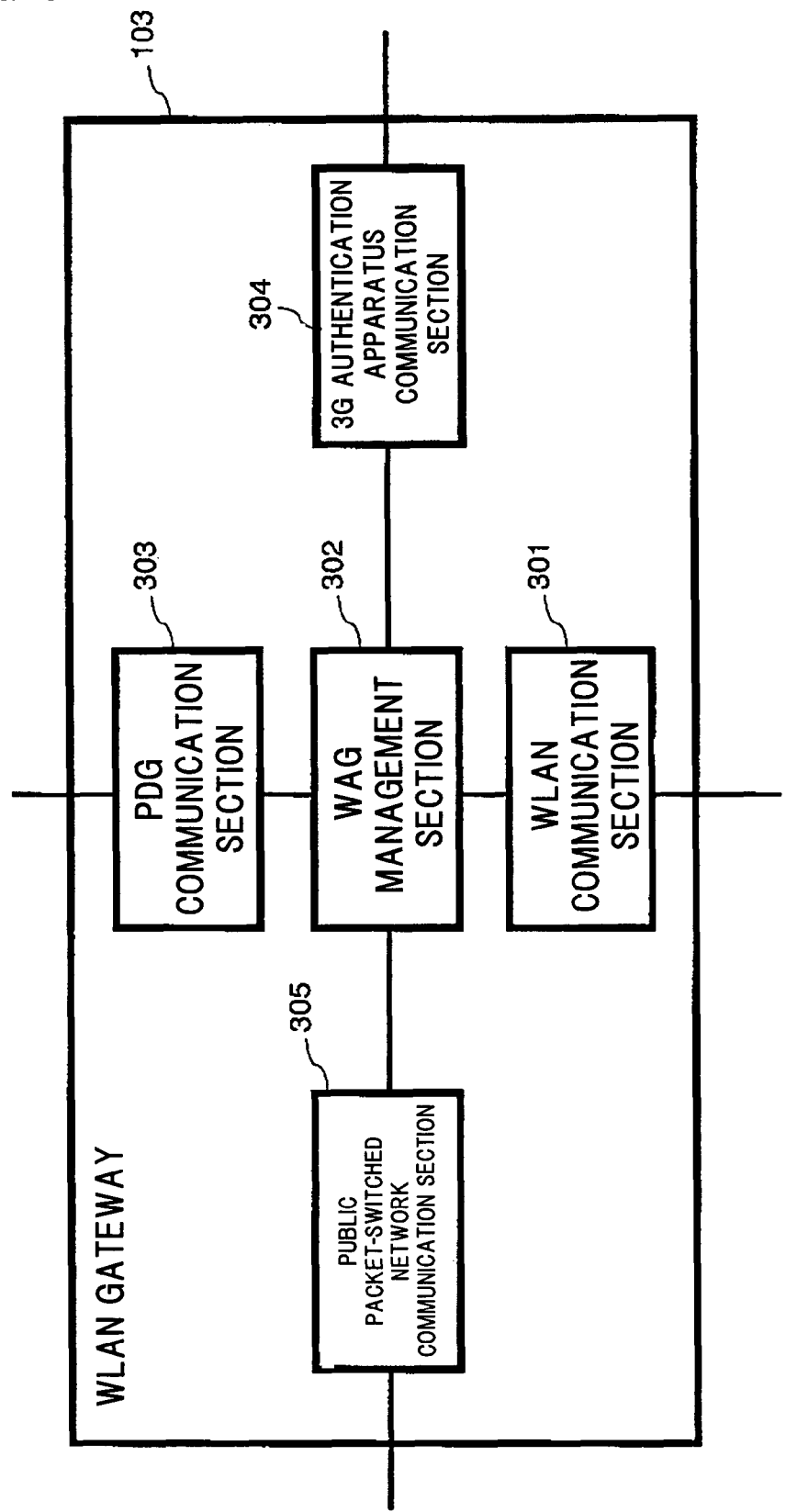
FIG. 3 is a diagram showing a configuration of a WLAN gateway according to the first embodiment.

FIG. 3 shows in detail a configuration of the WLAN gateway 103 used in the embodiment. The WLAN gateway 103 includes multiple communication interfaces for connecting to the packet data gateway 104, the 3G authentication apparatus 109, the WLAN access network 102, and the public packet-switched network 112.

A WLAN communication section 301 has the function of transmitting traffic involved in packet communication that uses the WLAN to and from the WLAN access network 102. A PDG communication section 303 has the function of communicating with the packet data gateway 104 and transmits traffic involved in packet communication that uses the WLAN. A public packet-switched network communication section 305 has the function of transmitting traffic involved in packet communication that uses the WLAN to the public packet-switched network 112. A 3G authentication apparatus communication section 304 has the function of communicating with the 3G authentication apparatus 10 and receives a filter setting notification.

A WAG management section 302 has the functions of updating a WAG management table in accordance with filter setting notification received from the 3G authentication apparatus 109 and setting a filter that determines whether packets should be passed to the packet data gateway 104. In particular, the WAG management section 302 in the present embodiment has the functions of separating IP packets according to IP address or port number from which they were transmitted or to which they are to be transmitted, to transfer them to either the 3G network side (105, 106, 107, 108 and 110) or the wireless LAN side (102, 103, 104 and 114) and notifying the setting to other devices.

Operation according to the embodiment will be described below. An overview of the present invention will be described first. In the wireless communication system of the present embodiment, when a user enters an area of the WLAN from an area of the mobile communication network while communicating over the mobile communication network, the 3G authentication apparatus 109 assigns a local IP address to be used in the WLAN access network 102 to the terminal 101, on the basis of user authentication and service authentication in the mobile communication network and the WLAN. Then, the 3G authentication apparatus 109 notifies to the WLAN gateway 102 a filter setting that limits packets that are permitted to pass, on the basis of the service authentication. Details of the operation will be described below with reference to drawings.

Figure 4:
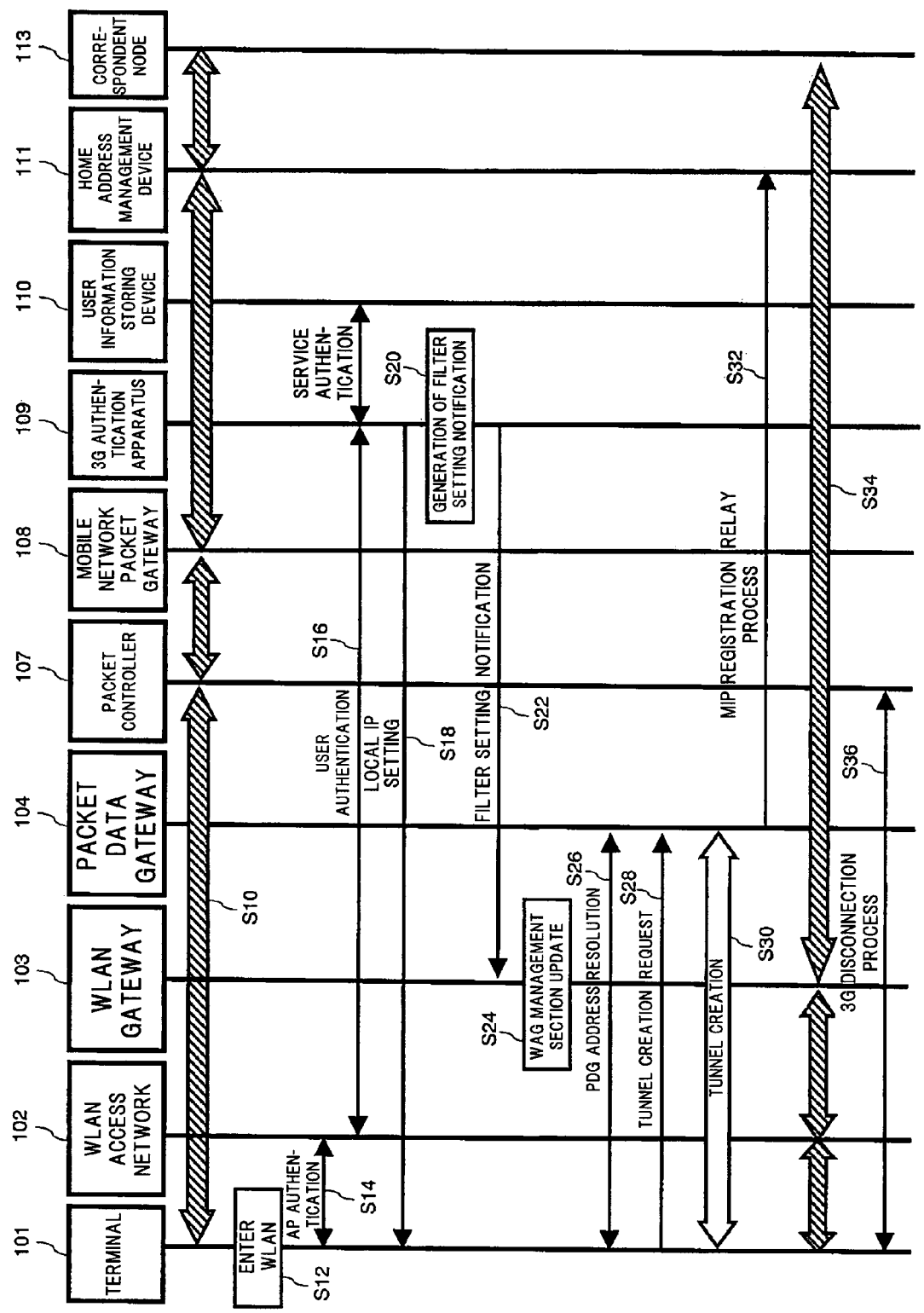
FIG. 4 is an operation sequence diagram showing a flow of interworking between a WLAN and a mobile communication network according to the first embodiment.

FIG. 4 is an operation sequence diagram showing a process flow for switching traffic of packet communication from the mobile communication network to the WLAN when the terminal 101 performing packet communication moves from the mobile communication network into an area of the WLAN.

The terminal 101 that is using the mobile communication network performs IP packet communication with the correspondent node 113 through the base station 105, the radio network controller 106, the packet controller 107, and the mobile network packet gateway 108 (S10). The IP address of the terminal 101 has been assigned by the mobile network packet gateway 108. The IP address is an address with which the correspondent node 113 can uniquely identify the terminal 101 and is the remote IP address in the present embodiment.

Packet communication in the mobile communication network is performed by creating an IP tunnel between nodes and by encapsulating the IP packets for transmission. GTP is used between the mobile network packet gateway 108 and the packet controller 107 and between the packet controller 107 and the radio network controller 106. The IP packets are converted into a logical channel or transport channel as appropriate in the radio network controller 106 and are transferred to the base station 105 by using IP transport. The base station 105 converts the channel into a physical channel of W-CDMA and communicates with the terminal 101.

When the terminal 101 enters the WLAN area (S12), the terminal 101 detects the radio field of the WLAN. The terminal 101 performs an authentication process for the terminal 101 to use an access point within the WLAN access network 102 (S14). Then, user authentication processing is performed between the WLAN access network 102 and the 3G authentication apparatus 109 (S16). In doing this, the 3G authentication apparatus 109 accesses the user information storing device 110 to authenticate whether the user is a subscriber to an interworking service. After the authentication is successfully completed, the terminal address determining section 205 in the 3G authentication apparatus 109 determines a local IP address to be used by the terminal 101 in the WLAN access network 102. The 3G authentication apparatus 109 sends the local IP address to the terminal 101 (S18). Thus, the local IP address is assigned to the terminal 101.

The 3G authentication management section 202 of the 3G authentication apparatus 109 then provides the local IP address assigned to the terminal 101 and the result of authentication of the user to the filter setting section 206. The filter setting section 206 of the 3G authentication apparatus 109 generates a filter setting notification on the basis of the local IP address of the terminal 101 and the user's authentication information received from the 3G authentication management section 202 (S20). Then, the 3G authentication apparatus 109 provides the filter setting notification to the WLAN gateway 103 through the WAG communication section 204 (S22).

FIG. 5 shows an example of data in a filter setting notification 500 generated. The filter setting notification 500 contains a user authentication ID 501, a 3G user identifier 502, a local IP address 503, a pass IP address 504, and a pass port number 505. The user authentication ID 501 is an ID required for authentication of a user having an interworking service agreement. The 3G user identifier 502 is a fixed user identifier IMSI (International Mobile Subscriber Identity) assigned to the terminal 101 in the mobile communication network. The user authentication ID 501 may be omitted and the 3G user identifier 502 alone may be set. The local IP address 503 is an address determined by the terminal address determining section 205 and is information for identifying the terminal 101 in the WLAN. The pass IP address 504 and the pass port number 505 are required for the user to access the service server 114 in the mobile communication network that provides a service under an agreement with the user, on the basis of service authentication performed with the user information storing device 110.

Figure 7:
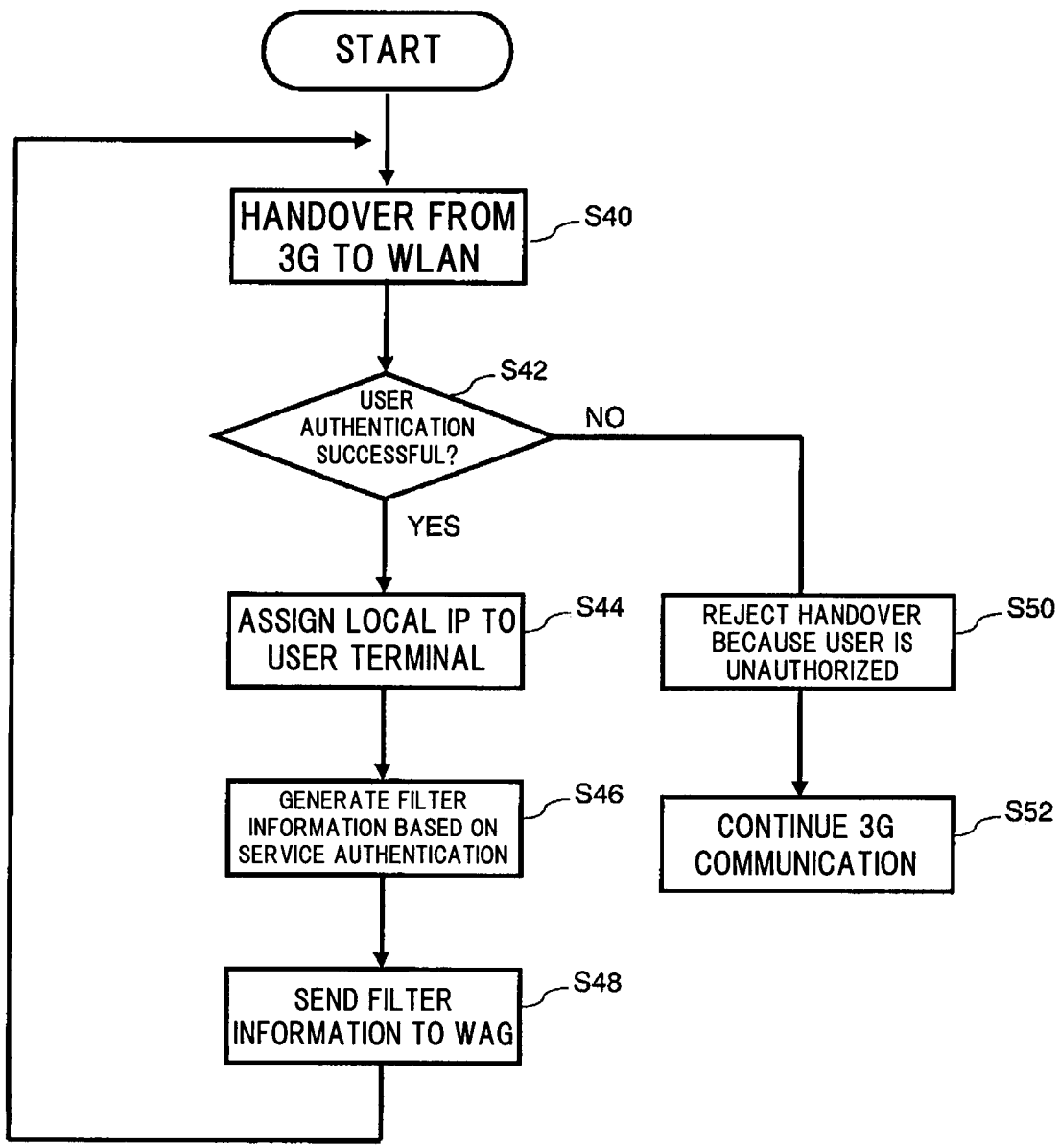
FIG. 7 is a flowchart showing operation of a filter setting section according to the first embodiment.

FIG. 7 is a diagram showing operation of the 3G authentication apparatus 109 for generating the filter setting notification 500. When the terminal 101 that is performing packet communication over the mobile communication network switches traffic transmission from the mobile communication network to the WLAN (S40), the 3G authentication management section 202 performs user authentication processing (S42). If the authentication is successful, the terminal address determining section 205 assigns a local IP address to be used by the terminal 101 in the WLAN access network 102 (S44). The 3G authentication management section 202 notifies the assigned local IP address and information concerning user authentication and service authentication to the filter setting section 206. The filter setting section 206 generates the filter setting notification 500 based on the local IP address of the terminal 101 and the user and service authentication information received from the 3G authentication management section 202 (S46). The 3G authentication apparatus 109 then sends the notification to the WLAN gateway 103 through the WAG communication section 204 (S48).

If the authentication by the 3G authentication management section 202 fails (NO at S42), it means that the terminal 101 does not have an interworking service agreement, therefore the traffic transmission switching to the WLAN is rejected (S50). The rejected user keeps performing the packet communication over the mobile communication network (S52).

In FIG. 4, the WAG management section 302 of the WLAN gateway 103 which has received the filter setting notification 500 updates a WAG management table in accordance with the filter setting notification 500 (S24). With this, a filter is set for limiting the passage of packets to the packet data gateway 104.

Figure 6:
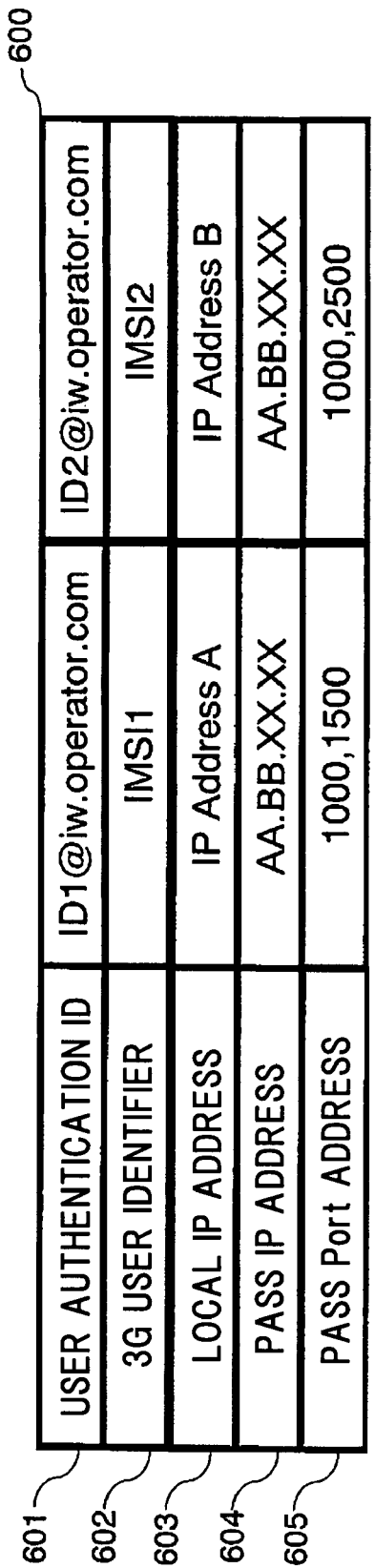
FIG. 6 is a diagram showing a WAG management table according to the first embodiment.

FIG. 6 shows details of a WAG management table 600. The WAG management table 600 contains a user identification ID 601, a 3G user identifier 602, a local IP address 603, a pass IP address 604, and a pass port number 605. These items of information are the same as those in the filter setting notification 500. These items of information are maintained in the WAG management table 600 until the user disconnects the packet communication. As shown in FIG. 6, the WAG management table 600 manages these items of information for multiple users that are in connection with the WLAN.

Figure 8:
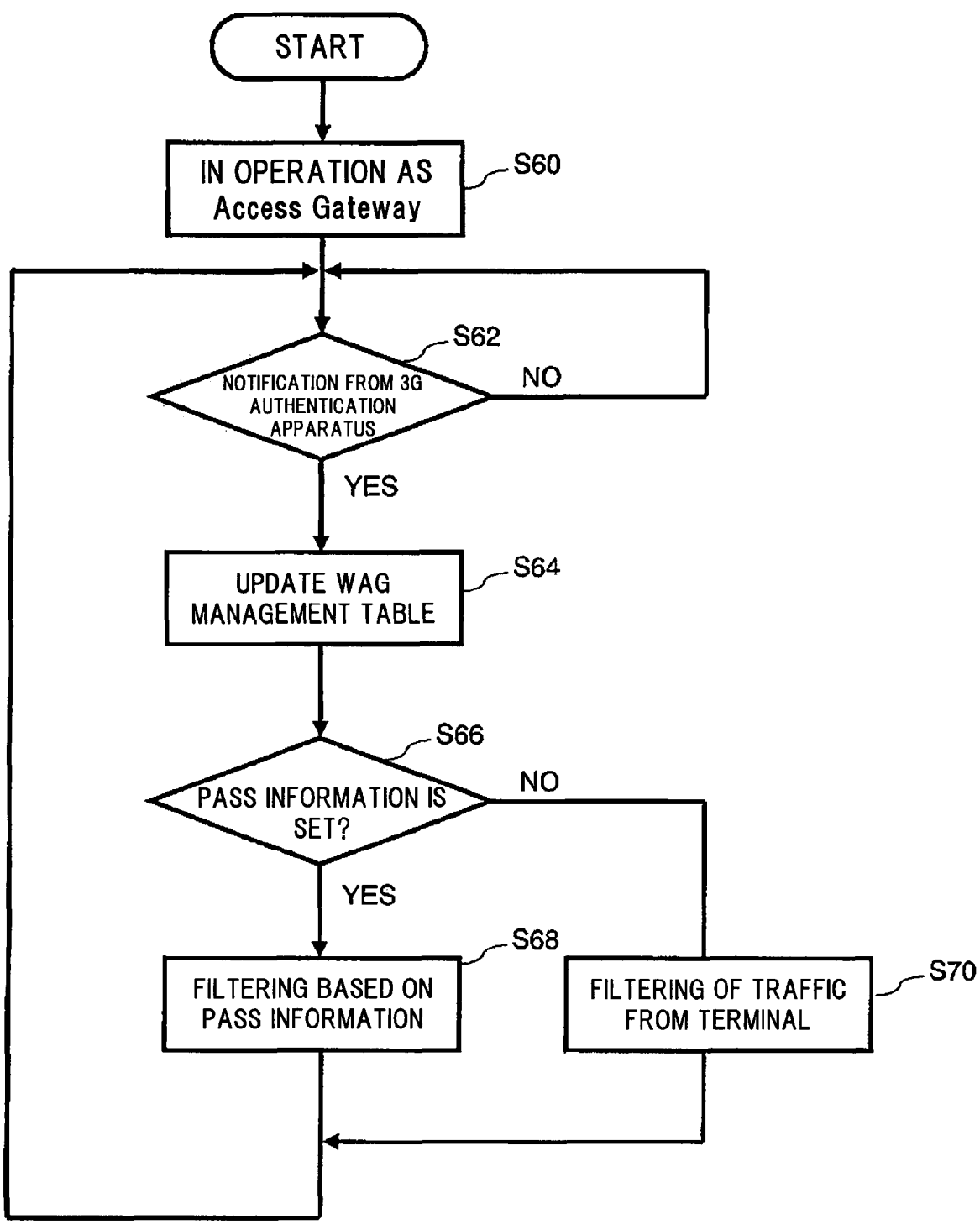
FIG. 8 is a flowchart of operation of a WAG management section according to the first embodiment.
Figure 9:
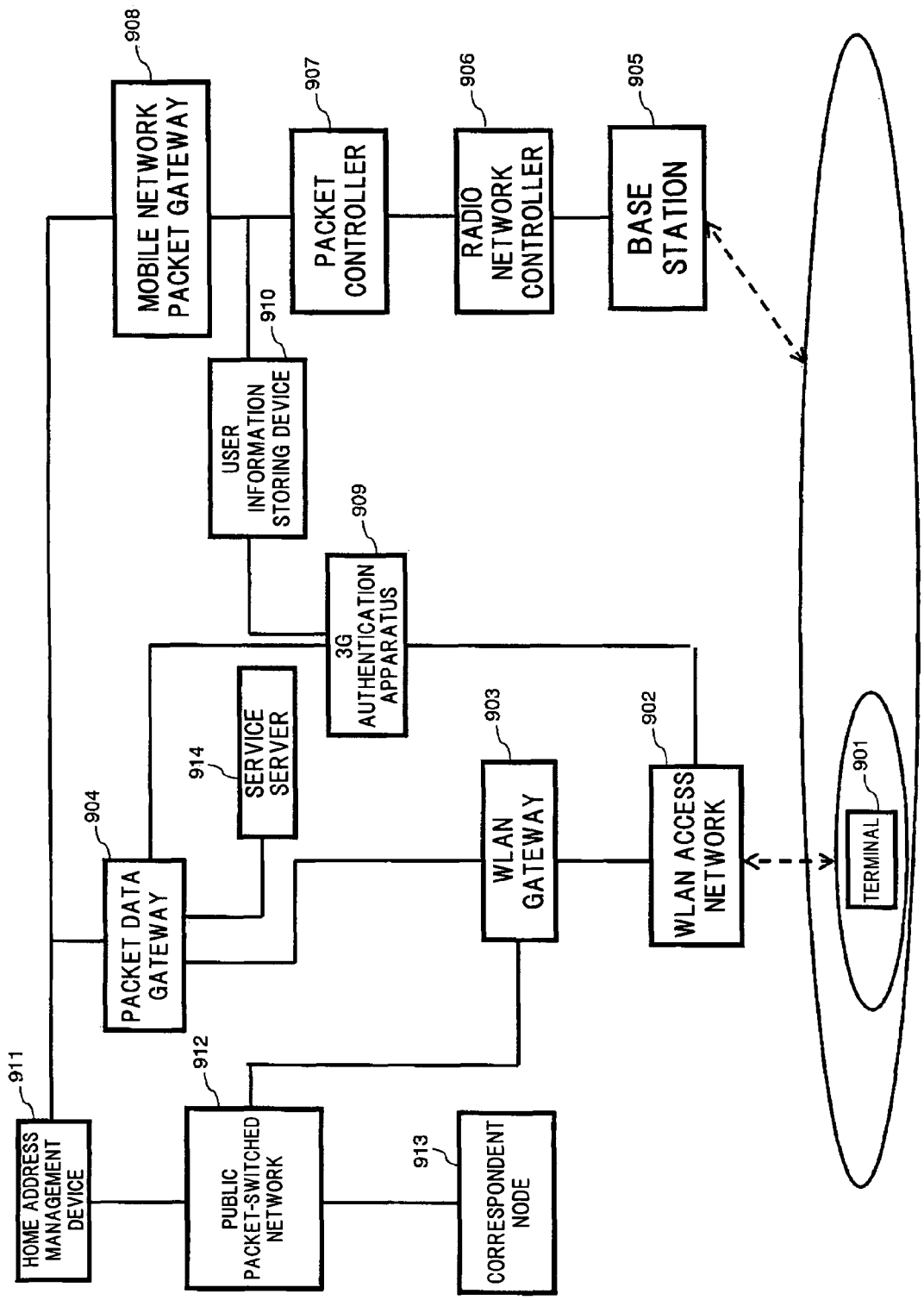
FIG. 9 is a diagram showing an architecture of a conventional interworking system between a WLAN and a mobile communication network.
Figure 10:
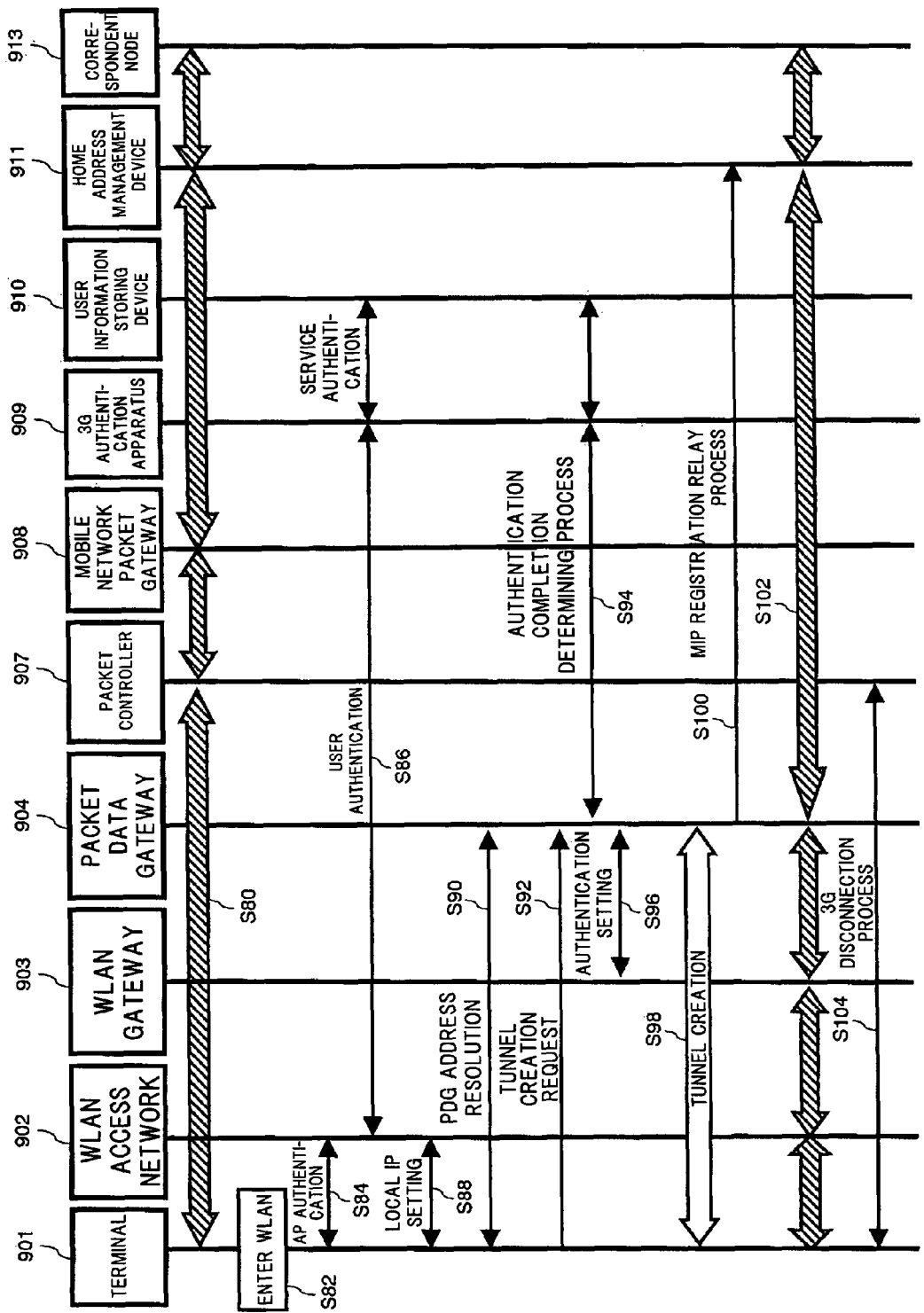
FIG. 10 is an operation sequence diagram showing a flow of conventional interworking between a WLAN and a mobile communication network.

FIG. 8 shows filtering control operation performed by the WAG management section 302. While the WLAN gateway 103 is operating as an access gateway (S60), the WAG management section 302 receives the filter setting notification 500 from the 3G authentication apparatus 109 (S62). The WAG management section 302 updates the WAG management table 600 on the basis of the information in the notification (S64). Then, the WAG management section 302 checks the pass IP address 604 and the pass port number 605 in the updated WAG management table 600 (S66). If the pass IP address 604 or the pass port number 605 is set (YES at S66), the WAG management section 302 performs filtering control so that traffic directed from the local IP address 503 associated with the user to the pass IP address 604 or the pass port number 605 is transferred to the packet data gateway 104 (S68).

If neither the pass IP address 604 nor the pass port number 605 is set (NO at S66), the WAG management section 302 performs filtering control so that traffic from the local IP address 503 associated with the user is not transferred to the packet data gateway 104 but to the public packet-switched network 112 (S70).

In FIG. 4, the terminal 101 issues a PDG address resolution request to the packet data gateway 104, which acts as the gateway for the terminal 101 to perform IP packet communication with the correspondent node 113 in the mobile communication network over the WLAN (S26). The packet data gateway 104 assigns an IP address to the terminal 101 for using the WLAN in the mobile communication network. The IP address uniquely identifies the terminal 101 in the mobile communication network.

The terminal 101 sends a tunnel creation request to the packet data gateway 104 over the WLAN (S28). A tunnel of IP is created between the terminal 101 and the packet data gateway 104 (S30). In the present embodiment, the 3G authentication apparatus 109 has sent the filter setting notification 500 to the WLAN gateway 103 (S22) and filter setting has already completed in the WLAN gateway 103. Therefore, the packet data gateway 104 does not need to obtain information about service subscription of the user and perform authentication anew for setting a filter in the 3G authentication apparatus 109.

After the tunnel is created, the terminal 101 registers the remote IP address in the home address management device 111 through the packet data gateway 104 (S32). Once the remote IP address is registered, the home address management device 111 changes the destination of packets sent from the correspondent node 113 to the terminal 101 associated with the new remote IP address. For access to a server on the Internet from the terminal other than access to a service server provided by the mobile communication network, the filter set by the WAG management section 302 prevents traffic to the packet data gateway 104 and causes the traffic to flow from the WLAN gateway 103 directly to the public packet-switched network 112.

After the connection to the WLAN is thus established (S34), the terminal 101 disconnects transmission over the mobile communication network used before entering the WLAN area. This disconnection process is initiated by issuing a 3G disconnection to the packet controller 107 (S36).

The wireless communication system according to the present embodiment has been described in which the 3G authentication apparatus, the WLAN gateway, and the mobile communication network interwork with the WLAN.

The wireless communication system according to the present invention enables the WLAN gateway 103 to control traffic transmission of packet communication used from the WLAN and to prevent traffic other than traffic that accesses the service server 114 provided by the mobile communication network from being transmitted to the packet data gateway 104. Thus, the wireless communication system has the effect of reducing traffic transmitted over the WLAN and minimizing the congestion.

In the wireless communication system according to the present embodiment, the 3G authentication apparatus 109 generates the filter setting notification 500 containing a local IP address of the terminal 101, a pass IP address and pass port number based on the result of user authentication, and provides the notification 500 to the WLAN gateway 103. The WAG management section 302 of the WLAN gateway 103 is enabled to set a filter based on the information in the notification 500. The 3G authentication apparatus 109 may set a local IP address and a filter collectively on the basis of the result of authentication and may directly communicate the information about the setting to the WLAN gateway 103. Thus, once mutual authentication is performed, the need for an additional authentication process during creation of a tunnel for traffic transmission over the WLAN can be eliminated and the time required authentication for connecting to the WLAN can be reduced. Because the 3G authentication apparatus 109 provides the filter setting to the WLAN gateway 103 without waiting for operation of the terminal 101, the WAG management section update processing S24 can be started ahead of time. Thus, the possibility of discontinuity in real-time communication such as videoconference or video delivery over the Internet can be reduced.

Furthermore, because the WAG management section 302 of the WLAN gateway 103 changes the transfer destination of IP packets in accordance with a setting of the filter, the amount of IP packets flowing into the public packet-switched network can be reduced and the load in the public packet-switched network, which is a high-cost network, can be reduced.

While the embodiment of the present invention preferable as of the date of preparation of this application has been described above, it will be understood that various modification can be made to the embodiment and it is intended to cover in the attached claims all such modifications and variations as fall within the true spirit and scope of the present invention.

As has been described above, the present invention has an advantageous effect that traffic in another network can be reduced and congestion can be minimized, and is useful as an interworking system between networks of different types such as between a mobile communication network and a WLAN (Wireless LAN) or as an authentication apparatus used in such a system.

The invention claimed is:

1. A communication management apparatus connected to a mobile communication network and a wireless LAN, wherein the mobile communication network includes an authentication apparatus for providing authentication service, and a service server for providing other services, said communication management apparatus comprising:

a communication section which, upon reception from a wireless LAN gateway of a connection request reception notification indicating the reception of a connection request from a mobile unit, obtains information indicating a service, provided by the service server of the mobile communication network, that is available to a mobile unit that has sent the connection request;

a terminal address determining section which sets a mobile-unit IP address identifying the mobile unit within the wireless LAN when the communication section obtains the information indicating the service;

a filter setting section which generates filter information in which information identifying the mobile unit is associated with a mobile-communication-network-service IP address or port number to be used in the service indicated by the information obtained by the communication section, the filter information being an indicator for a switching determination in which packets received by the wireless LAN gateway from the mobile unit for accessing a service provided by the service server of the mobile communication network should be transmitted to a gateway connected to the mobile communication network, and in which packets received by the wireless LAN gateway from the mobile unit for a purpose other than a service provided by the service server of the mobile communication network should be transmitted to a public packet switched network; and a WAG communication section which transmits the filter information set by the filter setting section to the wireless LAN gateway.

2. A communication management apparatus connected to a mobile communication network and a wireless LAN, wherein the mobile communication network includes an authentication apparatus for providing authentication service, and a service server for providing other services, said communication management apparatus comprising:

an authentication management section which, upon reception from a wireless LAN gateway of a connection request reception notification indicating the reception of a connection request from a mobile unit, performs authentication as to whether the mobile unit is allowed to connect to the wireless LAN;

a communication section which obtains information indicating a service, provided by the service server of the mobile communication network, that is available to the mobile unit that has sent the connection request;

a terminal address determining section which sets a mobile-unit IP address identifying the mobile unit within the wireless LAN when information indicating the service is obtained by the communication section;

a filter setting section which generates filter information in which information identifying the mobile unit is associated with a mobile-communication-network-service IP address or port number to be used in the service indicated by the information obtained by the communication section, the filter information being an indicator for a switching determination in which packets received by the wireless LAN gateway from the mobile unit for accessing a service provided by the service server of the mobile communication network should be transmitted to a gateway connected to the mobile communication network, and in which packets received by the wireless LAN gateway from the mobile unit for a purpose other than a service provided by the service server of the mobile communication network should be transmitted to a public packet switched network; and a WAG communication section which transmits the filter information set by the filter setting section to the wireless LAN gateway.

3. A wireless LAN gateway which is connected to a mobile communication network and a wireless LAN and relays packets from a mobile unit to the wireless LAN, wherein the mobile communication network includes an authentication apparatus for providing authentication service, and a service server for providing other services, the wireless LAN gateway comprising:

a filter information obtaining section which obtains filter information in which an IP address to be used in a service, provided by the service server of the mobile communication network, that is available to the mobile unit is associated with identification information of the mobile unit; and a packet controlling section which, upon transmission of packets from the mobile unit, reads an IP address from filter information containing identification information of the mobile unit that has sent the packets and, when the destination of the packets sent from the mobile unit matches the IP address read from the filter information, transfers the packets to a gateway that is connected to the mobile communication network and that relays packets from a public packet-switched network to the mobile communication network, and when the destination does not match the IP address, transfers the packets to the public packet-switched network without passing the packets through the gateway.

4. A wireless communication system comprising a wireless LAN gateway which controls packet communication in a wireless LAN connected to a mobile communication network and a communication management apparatus which performs authentication as to whether a mobile unit is allowed to connect to the wireless LAN, wherein the mobile communication network includes an authentication apparatus for providing authentication service, and a service server for providing other services, wherein, the communication management apparatus comprises:

a communication section which, upon reception from the wireless LAN gateway of a connection request reception notification indicating the reception of a connection request from a mobile unit, obtains information indicating a service, provided by the service server of the mobile communication network, that is available to a mobile unit that has sent the connection request;

a terminal address determining section which sets an IP address identifying the mobile unit in the wireless LAN when the information indicating the service is obtained by the communication section;

a filter setting section which generates filter information by associating information identifying the mobile unit with an IP address or a port number to be used in the service indicated by the information obtained at the communication section; and a WAG communication section which transmits the filter information set by the filter setting section to the wireless LAN gateway; and the wireless LAN gateway comprises:

a filter information obtaining section which obtains filter information in which an IP address to be used in a service, provided by the service server of the mobile communication network, that is available to the mobile unit is associated with identification information of the mobile unit; and a packet controlling section which, upon transmission of packets from the mobile unit, reads an IP address from filter information containing identification information of the mobile unit that has sent the packets and, when the destination of the packets sent from the mobile unit matches the IP address read from the filter information, transfers the packets to a gateway that is connected to the mobile communication network and that relays relaying packets from a public packet-switched network to the mobile communication network, and when the destination does not match the IP address, transfers the packets to the public packet-switched network without passing the packets through the gateway.

5. A communication management method performed by a communication management apparatus connected to a mobile communication network and a wireless LAN, wherein the mobile communication network includes an authentication apparatus for providing authentication service, and a service server for providing other services, said communication management method comprising:
- a service information obtaining step of, upon reception from a wireless LAN gateway of a connection request reception notification indicating the reception of a connection request from a mobile unit, obtaining information indicating a service, provided by the service server of the mobile communication network, that is available to a mobile unit that has sent the connection request;
- a terminal address determining step of setting an IP address identifying the mobile unit within the wireless LAN when the information indicating the service is obtained at the service information obtaining step;
- a filter setting step of generating filter information in which information identifying the mobile unit is associated with an IP address or a port number to be used in the service indicated by the information obtained at the service information obtaining step, the filter information being an indicator for a switching determination in which packets received by the wireless LAN gateway from the mobile unit for accessing a service provided by the service server of the mobile communication network should be transmitted to a gateway connected to the mobile communication network, and in which packets received by the wireless LAN gateway from the mobile unit for a purpose other than a service provided by the service server of the mobile communication network should be transmitted to a public packet switched network; and
- a filter information transmitting step of transmitting the filter information set at the filter setting step to the wireless LAN gateway.

6. A communication management method in a wireless LAN comprising a wireless LAN gateway which controls packet communication in the wireless LAN connected to a mobile communication network and a communication management apparatus which performs authentication as to whether a mobile unit is allowed to connect to the wireless LAN, wherein the mobile communication network includes an authentication apparatus for providing authentication service, and a service server for providing other services, the communication management method comprising:
- a service information obtaining step of, by the communication management apparatus, upon reception from a wireless LAN gateway of a connection request reception notification indicating the reception of a connection request from a mobile unit, obtaining information indicating a service, provided by the service server of the mobile communication network, that is available to a mobile unit that has sent the connection request;
- a terminal address determining step of, by the communication management apparatus, setting an IP address identifying the mobile unit within the wireless LAN when the information indicating the service is obtained at the service information obtaining step;
- a filter setting step of, by the communication management apparatus, generating filter information by associating information identifying the mobile unit with an IP address or a port number to be used in the service indicated by the information obtained at the service information obtaining step;
- a filter information transmitting step of, by the communication management apparatus, transmitting the filter information set at the filter setting step to the wireless LAN gateway; and
- a packet controlling step of, by the wireless LAN gateway, upon transmission of packets from the mobile unit, reading an IP address from filter information containing identification information of the mobile unit that has sent the packets and, when the destination of the packets sent from the mobile unit matches the IP address read from the filter information, transferring the packets to a gateway that is connected to the mobile communication network and that relays packets from a public packet-switched network to the mobile communication network, and when the destination does not match the IP address, transferring the packets to the public packet-switched network without passing the packets through the gateway.

* * * * *